Feb. 23, 1943.  R. G. NAUGLE  2,311,683
AIRPLANE WING CONSTRUCTION
Filed Dec. 23, 1939  3 Sheets-Sheet 1
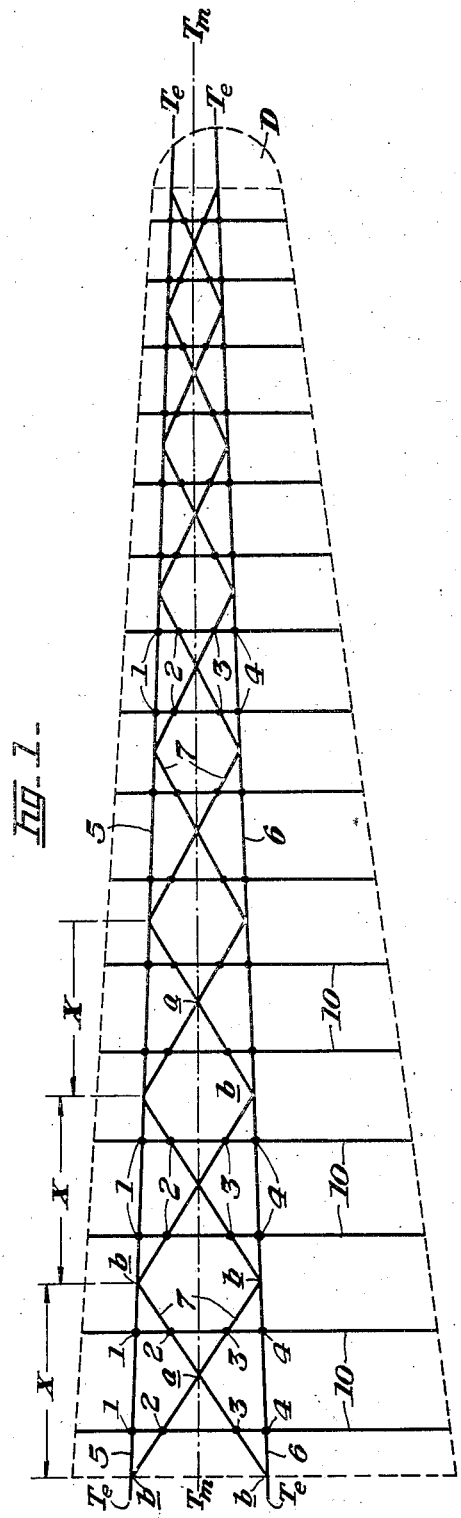
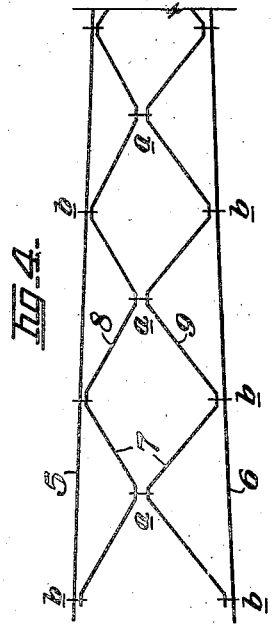
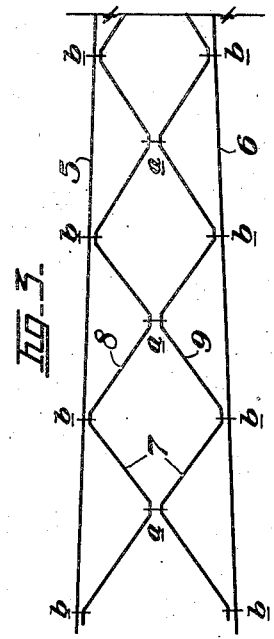
INVENTOR
RICHARD G. NAUGLE
BY Clarke & Doolittle
ATTORNEYS

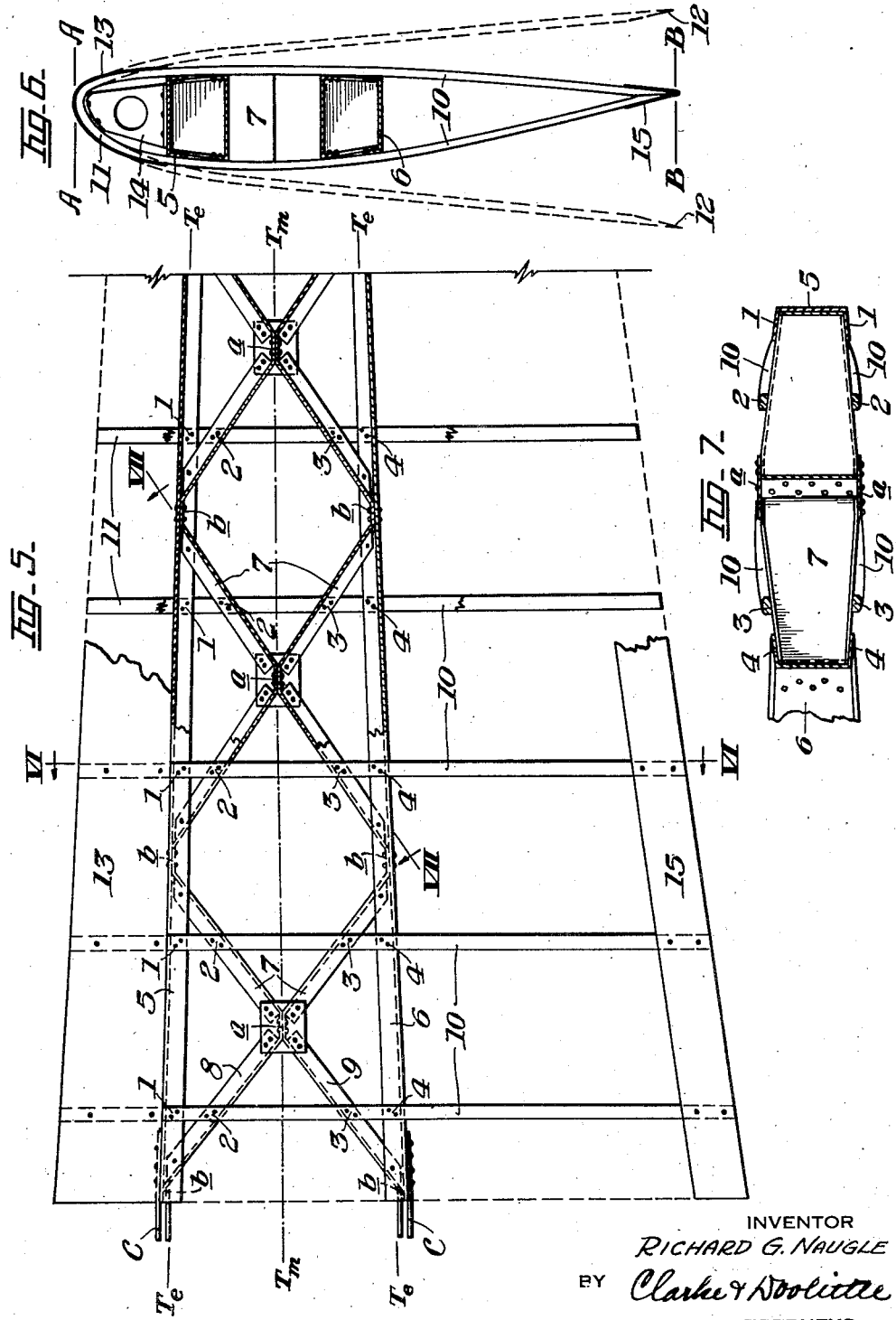

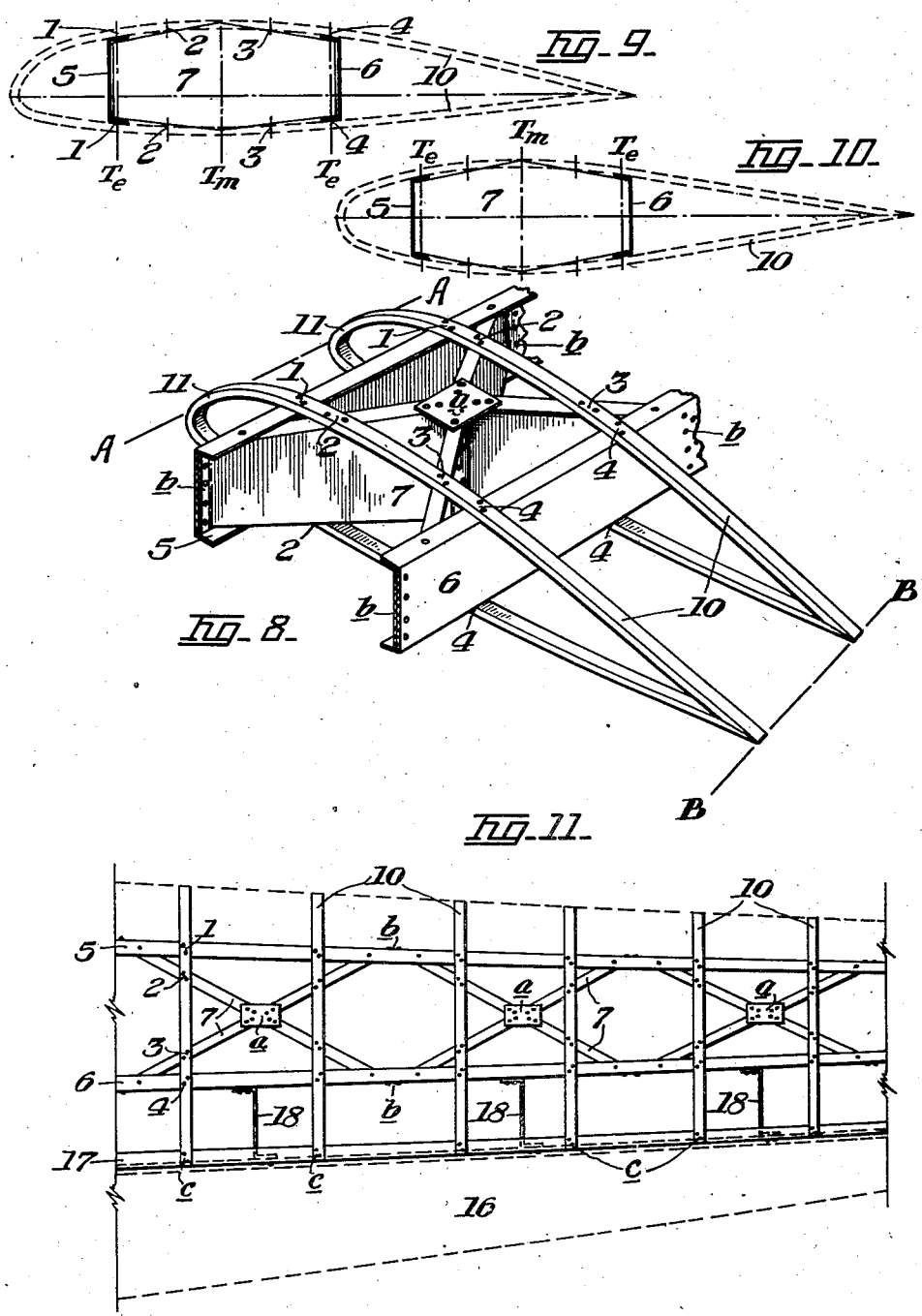

Patented Feb. 23, 1943

2,311,683

UNITED STATES PATENT OFFICE 2,311,683

AIRPLANE WING CONSTRUCTION

Richard G. Naugle, Ligonier, Pa.

Application December 23, 1939, Serial No. 310,674

15 Claims. (Cl. 244—123)

This invention relates to improvements in the construction of airplane wings, including an improved main wing spar unit with its associated structure for constructing a wing having selected airfoil characteristics, and providing a method of fabrication and assembly thereof which is highly practical and economical.

My invention has in view to provide an airplane wing including an improved spar unit and associated structure having increased resistance to torsional loading in flight, said spar unit being designed to have increased span-wise and chord-wise rigidity to absorb such loading primarily through simple bending and shear in the unit and its elements.

Further, by relation of the locus of the spar unit to the plane of maximum thickness of the wing, I have provided for simplicity and standardization in wing design and construction, whereby the spar units and/or their individual elements may become interchangeable.

In connection with the form of such a spar unit together with its relation to the plane of maximum thickness of the wing, I have also provided a positive determination of the wing cross-section, whereby the principal airfoil characteristics desired may be derived through the use of fairing strips or skeleton ribs laid over and receiving the contour as determined by the spar unit.

I thereby provide a highly positive and simplified method of wing construction which is adaptable to unit or quantity production alike.

It may be noted further, that my improved wing construction and method of fabrication thereof may be employed in the production of substantially all of the standard airfoil sections in design and use at the present time.

Additional objects and advantages will become apparent from the following description taken in connection with the accompanying drawings, wherein:

Fig. 1 is a diagrammatic skeletonized plan view of an airplane wing illustrating the spar and fairing construction of my invention;

Fig. 2 is an edge view of Fig. 1;

Figs. 3 and 4 are diagrammatic views of a portion of Fig. 1, showing modifications of the spar elements;

Fig. 5 is an enlarged plan view, partly in section, showing the inner portion of the wing structure of Fig. 1;

Fig. 6 is a cross-section taken on the line VI—VI of Fig. 5;

Fig. 7 is a partial cross-section taken on the diagonal line VII—VII of Fig. 5;

Fig. 8 is a perspective view of one of the wing bays illustrating my invention;

Figs. 9 and 10 are diagrammatic cross-sectional views illustrating the manner of determining the airfoil characteristics of the wing; and Fig. 11 is a plan view of the outer portion of the wing structure, showing an aileron mounting.

Referring to the drawings, my improved wing construction includes a composite spar unit formed by a front spar member 5 and a rear spar member 6 spaced apart by and forming a rigid chord-wise truss unit with a system of transverse bracing or webbing, generally designated 7.

In its preferred form, the bracing or webbing 7 comprises a system of crossed X-elements continuing along and between the spar members, and as such may be formed in various ways. One form of the X-bracing is illustrated diagrammatically in Figs. 3 and 4, comprising front and rear continuous zig-zag members 8 and 9 respectively, said members being alternately bent and rigidly joined to the spar elements 5 and 6 and to each other to form the desired X-bracing when assembled.

Referring to Figs. 1 and 9, the spar members or elements 5 and 6 are spaced intermediate or inwardly with respect to the front and rear edges of the wing, and with respect to the plane $T_m$ which is the plane of maximum thickness of the wing to be constructed. Said spar members 5 and 6 are preferably positioned in spaced planes $T_e$ forward and aft of the plane $T_m$.

In selecting the planes $T_e$ for the spar members, I prefer to locate one of said planes at or about the region of the critical center of pressure of the airfoil section selected, thereby providing one member of the composite spar unit in the region of the critical loading on the wing, the plane $T_e$ of the other spar member being selected on the other side of the plane $T_m$ as hereinafter described.

In forming the spar unit, the spar members 5 and 6 are constructed of sufficient depth to provide the desired depth dimension of the wing in said planes $T_e$ in connection with applied fairing strips or skeleton ribs 10, applied and secured thereto for supporting the wing covering or skin.

The X-bracing 7 is designed for application between the said spaced members 5 and 6, having the intersection $a$ of the diagonals of each X-portion preferably disposed in the plane $T_m$ of the wing. Said X-bracing is rigidly joined at points $a$ and is likewise rigidly connected where the diagonal portions meet the spar members 5—6 as indicated at $b$.

Each X-portion of the spar unit bracing 7 has two diagonal members crossing the space between the spar members 5 and 6, and fairing strips 19 laid transversely of the spar unit, between points $a$ and $b$ of the X-bracing system, cross each spar member and each diagonal, providing four points of support and attachment 1, 2, 3 and 4 for the upper and lower portions of said fairing strips as illustrated.

In order to provide for the support and attachment points 2 and 3 for the fairing strips 10, the depth of the diagonal portions of the X-bracing 7 may be varied to afford engagement by the reversely curved fairing strips in the transverse chord-wise spaced planes selected for said strips. Two fairing strips 10 may be employed at each X-portion of the bracing, said strips being centrally located with respect to the intersections $a$ and spaced apart from one-third to one-half of the span-wise extent of each X-portion of the bracing 7.

As illustrated in Figs. 6, 7, 8, and 9 the diagonal portions of the X-bracing have minimum depth or thickness at their points of attachment $b$ with the spar members 5 and 6, and increase in depth or taper toward their intersections $a$, the airfoil section shown having upper and lower positive cambers.

The location of the intersection $a$ of the X-bracing in the plane of maximum thickness $T_m$ and the spacing and depth of the spar members 5 and 6, provides suitable flexibility of design and dimension for the many conditions and variables arising in airplane wing construction.

The spacing of the planes $T_e$ from the plane $T_m$ and the variation in the depth or dimension of the intersection of the X-bracing diagonals at $a$, provides a positive determination of the proper slope of the diagonals and their depth in the transverse planes of the fairing strips 10 to provide the attaching points 2 and 3 therefor.

Due to the rigid composite spar unit construction, the spacing of the spar members 5 and 6 may be sufficiently great to directly carry the major portion of the external loading on the wing without undue torsional deflection thereof. In other words, the chord-wise rigidity of the provided truss is sufficient to support the loading on a substantial wing surface chord-wise of the wing.

In this connection, it will be noted that the strength and resistance of the spar unit is sufficiently great to enable the use of relatively light fairing strips 10, through which the external loading is applied directly to and absorbed by the truss unit.

From the foregoing it will be seen that the construction of the spar unit may be employed to determine the principal contour portions of the wing, which expedient materially aids in the fabrication of the wing. Fairing strips 10 of proper length may be preformed as indicated in dotted lines in Fig. 6, having loop portions 11 formed to the selected leading edge contour of the wing, said strips having their rear free ends 12 spaced to pass over the spar unit.

With the assembled spar unit positioned in relation to wing edge guide templates A—A and B—B (Figs. 6 and 8) the fairing strips 10 may be applied at their proper locations, and secured at attaching points 1, 2, 3 and 4 to the spar unit, the ends 12 being drawn together and secured by suitable rivets or the like.

The rigid composite wing structure thus formed by spar members, X-bracing and fairing strips is highly efficient under the loadings encountered in flight. Under critical conditions, the spar member in the region of the critical center of pressure assumes part of the load, as do the diagonals of the X-bracing, transmitting the same throughout the spar unit.

The intersecting diagonals of any X-portion of bracing 7 are designed as beams and each acts to support the other against lateral failure. Also, the strength of the fairing strips 10 further acts to resist lateral failure.

Spar members 5 and 6 are thereby well stabilized and efficient in resisting torsion, the torsional effect of the externally applied loading being absorbed principally through resistance to bending and shear in the assembled unit and its elements. The X-bracing or webbing effectively supplants the usual transverse or chord-wise compression struts and the wire diagonal tension struts, and supplies increased strength and resistance to the spar as a unit.

The wing construction described may be employed in cantilever design as illustrated, or may be employed with external struts or bracing. The inner ends of the spar members 5 and 6 are provided with attaching plates C rigidly secured thereto and apertured for direct attachment to the fuselage of the airplane in any suitable manner, the attachment being rigid for transmission of the wing loading directly to the fuselage.

In practice, the present invention may be embodied in many forms of construction. For example, the spar members 5 and 6 and X-bracing or webbing may be formed of sheet metal channels, suitably riveted, welded or otherwise secured in the relation set forth. The fairing strips 10 may be of wood such as spruce, or may be of sheet or extruded metal form as desired.

The assembled wing structure may include a formed sheet metal leading edge covering or nose strip 13, and reenforced bulkheads 14 may be installed within the nose portions 11 of the strips 10 as desired. Also, a trailing edge strip 15 may be applied over the converging ends 12 of the fairing strips, said strips 13 and 15 serving to tie the fairing strips together and to support the skin or wing covering at the wing edges.

Likewise, any of the well known means and methods of applying and securing the skin or covering to the wing structure may be employed, the same not forming part of the present invention and being so well known in the art as to not require a description thereof. A wing tip frame or unit D of conventional form may be applied directly to the ends of the spar members 5 and 6.

Fig. 11 illustrates a manner of mounting an aileron or other flap 16, for which purpose a false spar 17 may be extended span-wise aft of the rear spar member 6, being secured thereto by suitable braces or bulkheads 18. In such case, the fairing strips 10 are terminated at said false spar 17, being secured thereto as at $c$. The aileron 16 may then be hinged to the false spar 17 in any suitable manner for swinging control thereof.

A further feature of my invention resides in providing interchangeability as to the spar units and their members. As shown in the drawings, the planes $T_e$ of the spar members 5 and 6 may be planes of equal wing thickness, whereby spar members of uniform depth or thickness may be employed, the same thereby being interchangeable for either the right or left wing or for each other. Likewise, the X-bracing or webbing 7, as for example in the zig-zag form illustrated, may be interchangeable. This is particularly true where the zig-zag members form colinear diagonals as in Figs. 1 and 3.

In certain airfoil sections, the plane $T_m$ may occur so far forward as to necessitate unequal spacing between said plane and the planes $T_e$ of the front and rear spars. In such case, as illustrated in Fig. 4, the zig-zag bracing members will form angularly bent diagonals, but may be interchangeable as to the individual zig-zag portions employed to fabricate the complete X-bracing 7.

Fig. 10 illustrates a type of airfoil section wherein the upper and lower cambers are equal and equidistant from the chord, and wherein the planes $T_e$ are equidistant from the plane $T_m$. Hence, in wings of such section, the entire spar units as well as their respective constituent elements are interchangeable.

Various changes and modifications are contemplated within the scope of the following claims.

I claim:

1. In an airplane wing, a composite spar unit including a pair of outwardly converging span-wise spar members spaced on each side of the plane of maximum thickness of the wing and intermediate the front and rear edges of the wing, and continuous zig-zag X-bracing members disposed chord-wise of the wing and rigidly connecting said spar members and each other, the X-bracing comprising alternating diagonal members intersecting and rigidly joined with the spar members and with each other in the region of said plane of maximum thickness and extending midway to a maximum height conforming to that of transverse fairing strips secured thereto and to the spar members.

2. In an airplane wing, a composite spar unit including a pair of span-wise spar members spaced on each side of the plane of maximum thickness of the wing and intermediate of the front and rear edges of the wing, continuous zig-zag X-bracing members disposed chord-wise of the wing and rigidly connecting said spar members and each other, and a series of fairing strips disposed transversely of and secured to said spar members and bracing members and having continuous rounded front connection with each other.

3. In an airplane wing, a composite spar unit including a pair of span-wise outwardly converging spar members spaced on each side of the plane of maximum thickness of the wing and intermediate of the front and rear edges of the wing, continuous zig-zag X-bracing members of alternating varying depth disposed chord-wise of the wing and rigidly connecting said spar members and each other, and a series of fairing strips disposed transversely over and under said spar unit, each of said fairing strips being secured at spaced intervals to the spar members and X-bracing and having continuous rounded integral front portions.

4. In an airplane wing, a pair of spaced span-wise spar members intermediate the front and rear edges of the wing, continuous one piece fairing strips disposed across said members in spaced transverse planes, spar bracing disposed chord-wise of the wing between the spar members including diagonal oppositely sloping edge portions intersecting the planes of the fairing strips for engagement with said strips.

5. In an airplane wing, a pair of spaced span-wise spar members intermediate the front and rear increasingly converging edges of the wing, continuous one piece fairing strips disposed across said members in spaced transverse planes, spar bracing disposed chord-wise of the wing between the spar members including diagonal portions intersecting the planes of the fairing strips, said spar members and diagonals being of a depth in said planes for engagement with and to determine the wing contour to be defined by said strips.

6. In an airplane wing, a composite spar unit extending span-wise of the wing intermediate of the front and rear edges thereof and in the region of maximum thickness of the wing, said unit including a pair of spar members and a chord-wise X-bracing rigidly secured together, said spar members and bracing having varying sloping upper and lower edges providing a series of spaced attaching points in spaced transverse planes of the wing defining the wing curvature in said planes, and continuous one piece fairing strips rounded at the front, secured to the spar members and bracing at said attaching points.

7. In an airplane wing, a composite spar unit including a pair of span-wise spar members spaced on each side of the plane of maximum thickness of the wing and intermediate the front and rear edges of the wing, a series of transverse fairing strips supported by the spar members, and X-bracing disposed chord-wise of the wing and rigidly connecting said spar members, the X-bracing comprising continuous alternating diagonal member portions intersecting and rigidly joined to the spar members and each other in the region of said plane of maximum thickness, said diagonals having maximum depth in the middle of said plane and tapering convergingly toward said spar members to engage and support the fairing strips between the spar members, and continuous one piece fairing strips laid over and under the spar members and said X-bracing and secured thereto and rounded at the front.

8. In an airplane wing, a composite spar unit including a pair of span-wise spar members spaced on each side of the plane of maximum thickness of the wing and intermediate the front and rear edges of the wing, and X-bracing disposed chord-wise of the wing having diverging upper and lower edges toward their middle junction and rigidly connecting said spar members, the X-bracing comprising continuous alternating diagonal members intersecting and rigidly joined in the region of said plane of maximum thickness, a series of one piece fairing strips laid transversely of the spar unit in engagement with the members thereof above and below, each of said fairing strips engaging the spar members and the upper and lower diverging edges of two bracing diagonals to provide at least four spaced points of attachment for said strips.

9. In an airplane wing, a composite spar unit including a pair of span-wise outwardly converging spar members spaced on each side of the plane of maximum thickness of the wing and intermediate the front and rear edges of the wing, and X-bracing disposed chord-wise of the wing between and rigidly connecting said spar members, said X-bracing comprising a pair of continuous complemental zig-zag members increasing in depth toward a middle upper and lower connection alternately connecting the spar members and each other, the junctures of the zig-zag members with each other being of maximum depth with relation to their outer portions and lying in said plane of maximum thickness of the wing and providing contacting and connecting junction with transverse spar members and outer covering respectively.

10. In an airplane wing, a composite spar unit extending span-wise of the wing intermediate the front and rear edges of the wing, said unit including a pair of spar members and a chordwise X-bracing having a varying depth substantially equal to the wing thickness throughout, said spar members and bracing determining the wing curvature in spaced transverse planes of the wing, and continuous one piece fairing strips having rounded front ends with their intermediate portions supported by said members and bracing in said planes.

11. In an airplane wing, a composite spar unit extending span-wise of the wing intermediate the front and rear edges of the wing, said unit including a pair of spar members and a chordwise X-bracing having a varying depth substantially corresponding to the transverse wing thickness throughout, said spar members and bracing determining the wing curvature in spaced transverse planes of the wing, and continuous one piece looped fairing strips disposed in said planes having their intermediate portions supported by said spar members and bracing, the looped portions of said strips being alined forwardly of the spar unit to define the leading edge of the wing, said strips having their rear end portions alined to define the trailing edge of the wing.

12. In an airplane wing, a composite spaced apart outwardly converging double member spar unit extending span-wise of the wing between the front and rear increasingly converging edges thereof, continuous individual X-bracing members of alternating diagonal zig-zag form connected alternately to each spar member and to each other increasing in depth from their connections with the spar member to a middle maximum depth whereby to provide upper and lower edge portions conforming to the overall curvature of transversely applied fairing strips, and integrally looped individual fairing strips disposed transversely across the upper and lower edges of the spar members and bracing members and secured thereto and having their terminals connected at the rear edge portion of the wing.

13. In an airplane wing, a composite spaced apart double member spar unit extending span-wise of the wing between the front and rear edges thereof, continuous individual X-bracing members of zig-zag form connected alternately and at opposite sides to each spar member and on an intermediate axial line to each other, said bracing members increasing in depth between their outer connections with the spar members towards their junction on said axial line and providing bearing and connecting edge portions above and below for transversely applied fairing strips, and integrally looped individual fairing strips disposed transversely across the upper and lower edges of the spar members and bracing members and secured thereto.

14. In an airplane wing, the combination with a pair of longitudinal spaced apart outwardly converging spar members tapering in depth from their inner towards their outer ends, of a corresponding pair of continuous alternating diagonal bracing members of zig-zag form each having connection with one of the spar members on transversely common planes and with each other at the middle between such planes, the depth of said bracing members alternating between said connections whereby to provide upper and lower edge portions adapted to provide supporting contact with curving fairing strips, and looped fairing strips integrally looped at the front disposed transversely across the upper and lower edges of the spar members and bracing members and secured thereto.

15. In an airplane wing, a composite spaced apart outwardly converging double member spar unit extending span-wise of the wing between the front and rear edges thereof, X-bracing members of alternating diagonal zig-zag form connected alternately to each such spar member and to each other increasing in depth from their connections with the spar members to a middle maximum depth whereby to provide upper and lower edge portions conforming to the overall curvature of transversely applied fairing strips, looped fairing strips disposed transversely across the upper and lower edges of the spar members and bracing members and secured thereto, a rear supplemental spar member spaced beyond said double member spar unit and secured to the rear terminals of the fairing strips, and an aileron mounted on said supplemental spar member and extending therebeyond.

RICHARD G. NAUGLE.